W. K. BASSFORD.
FUEL SUPPLYING DEVICE FOR INTERNAL COMBUSTION ENGINES.
APPLICATION FILED FEB. 3, 1912.
1,226,940.
Patented May 22, 1917.
3 SHEETS—SHEET 1.
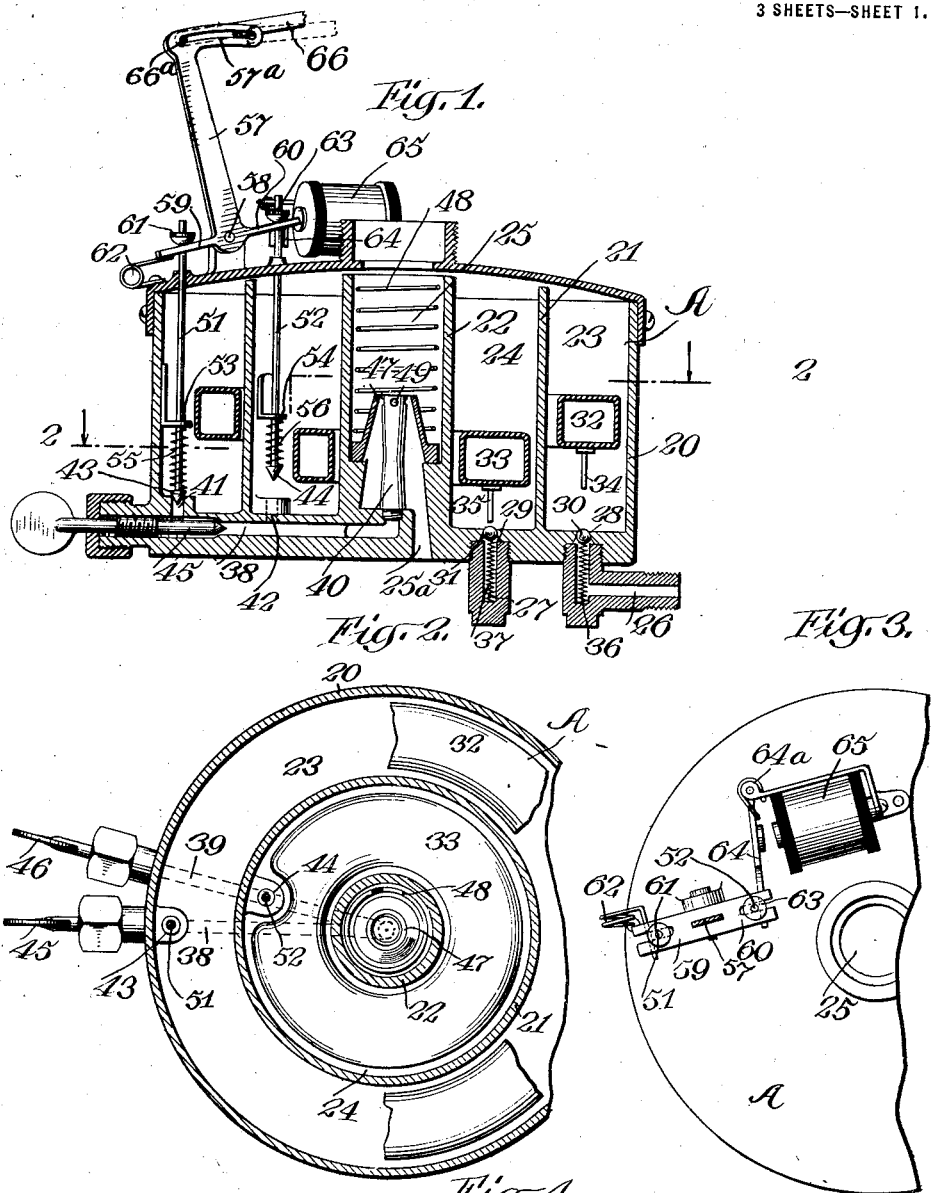
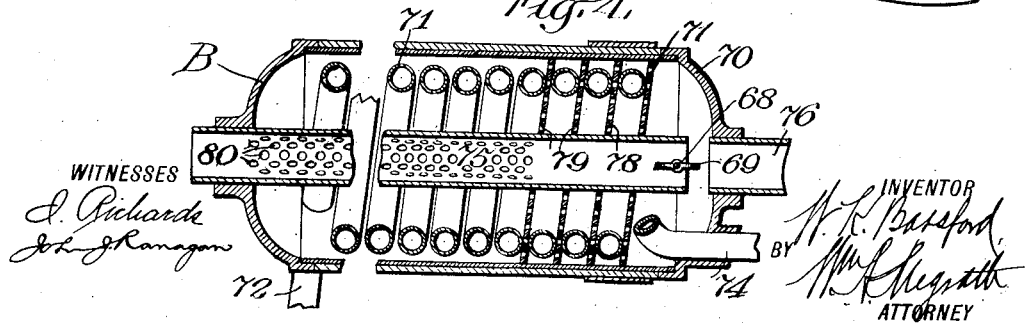
WITNESSES
INVENTOR
BY
ATTORNEY

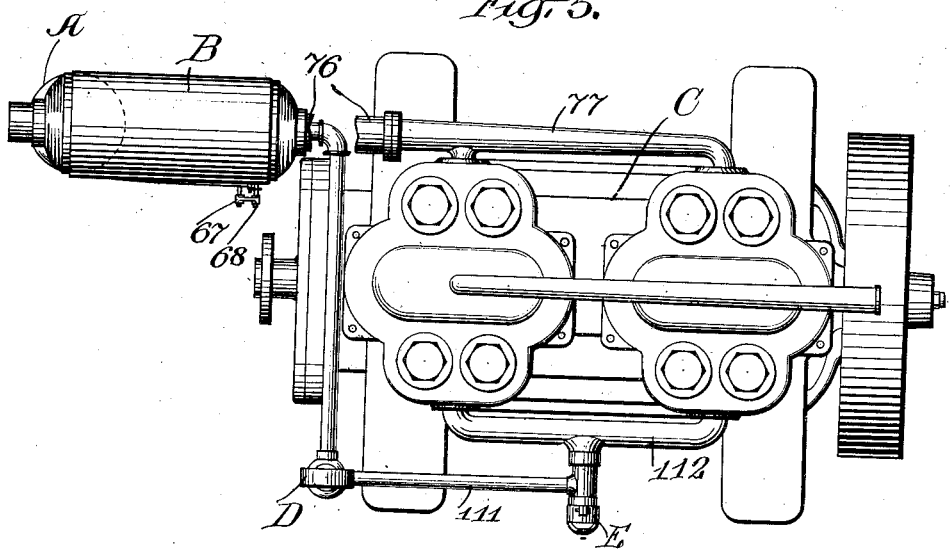
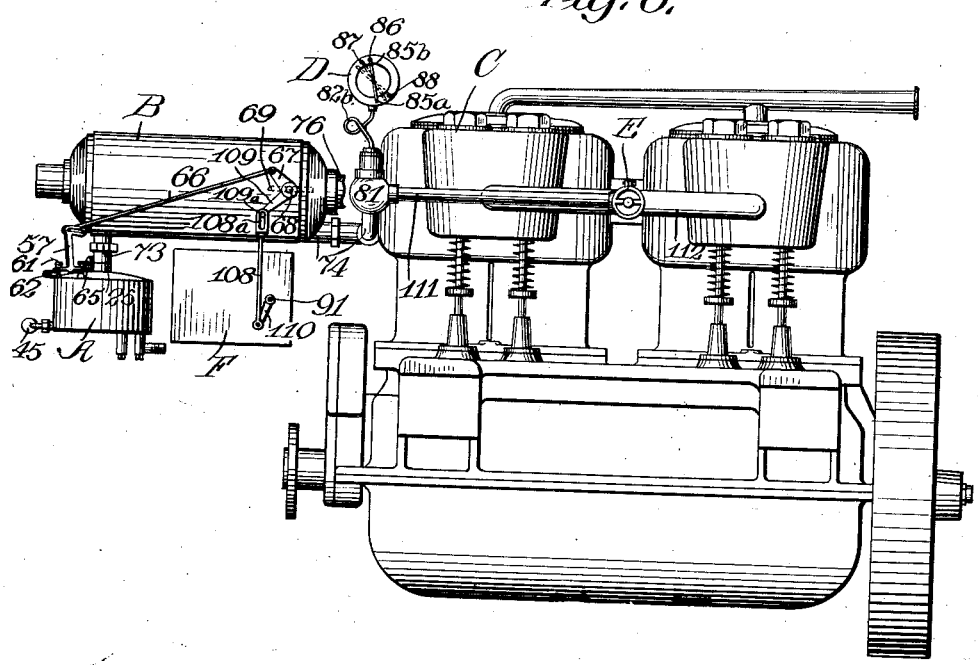

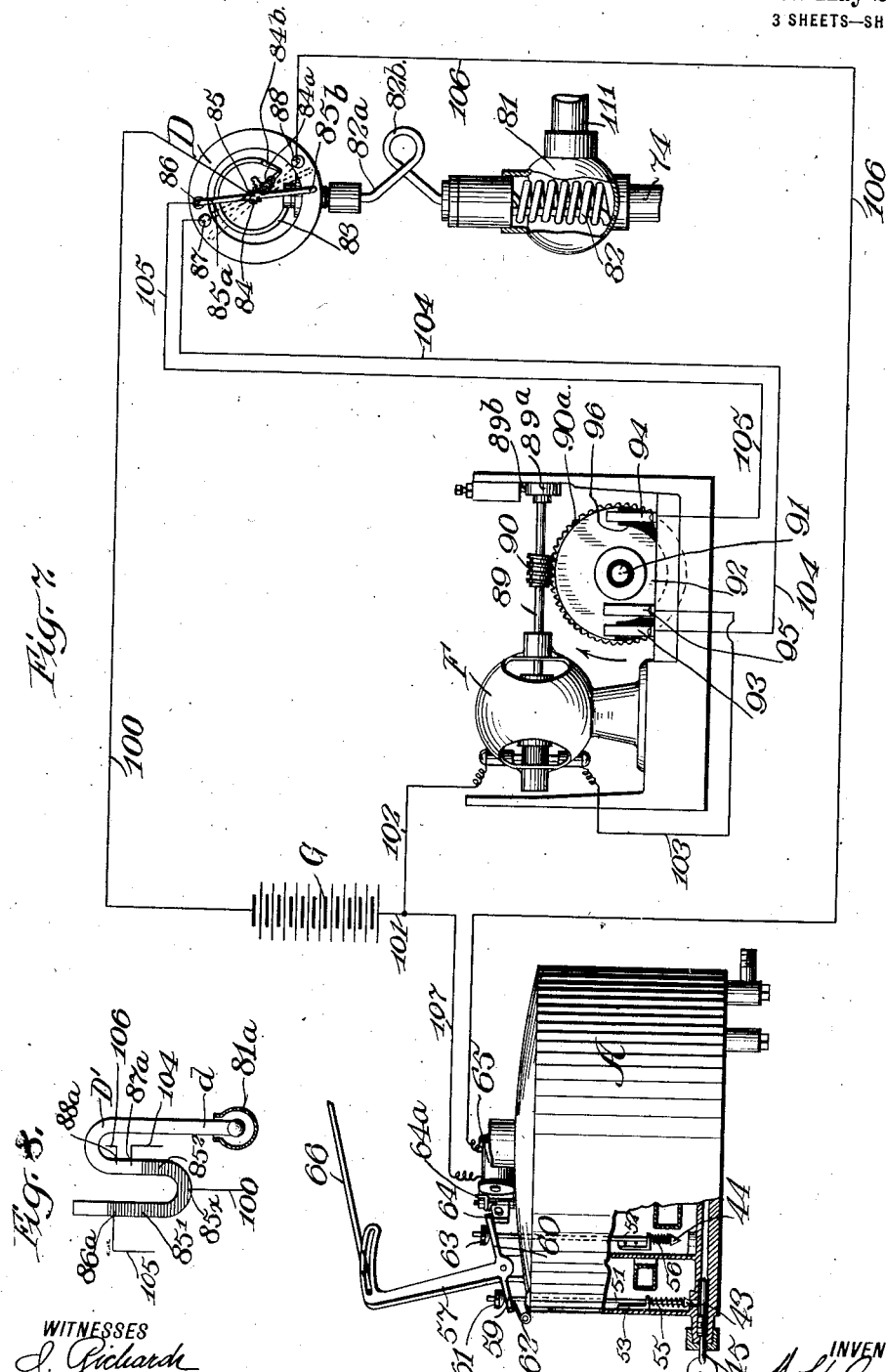

UNITED STATES PATENT OFFICE.

WILLIAM K. BASSFORD, OF PERTH AMBOY, NEW JERSEY, ASSIGNOR TO UNIVERSAL OIL CONVERTER COMPANY, OF LONG ISLAND CITY, NEW YORK, A CORPORATION OF NEW YORK.

FUEL-SUPPLYING DEVICE FOR INTERNAL-COMBUSTION ENGINES.

1,226,940.   Specification of Letters Patent.   Patented May 22, 1917.

Application filed February 3, 1912. Serial No. 675,274.

*To all whom it may concern:*

Be it known that I, WILLIAM K. BASSFORD, a citizen of the United States, and a resident of Perth Amboy, county of Middlesex, and State of New Jersey, have invented certain new and useful Improvements in Fuel-Supplying Devices for Internal-Combustion Engines, of which the following is a specification.

This invention relates to improvements in internal combustion engines of that class wherein hydrocarbon or other suitable fuel, such as gasolene, kerosene, crude oil or alcohol may be used.

In a more specific way it may be said that the present invention relates and aims to provide a practicable organization of an internal combustion engine and fuel supply system wherein liquid fuels of different specific qualities, such as gasolene and kerosene, for example, may be employed, the system including means for shifting automatically from one fuel to the other to meet conditions as they arise in the operation of the engine. A system of this style is disclosed in my pending application, Serial Number 641,187, filed July 29, 1911, the present invention embodying certain changes in the system of the earlier application.

The particular objects and the advantages of the present improvements will be apparent from the following description of the apparatus selected to exemplify the present improvements.

In the accompanying drawings illustrating the preferred construction and a relation of parts of the present system:

Figure 1 is a vertical section through an atomizer adapted for hydro-carbon fuels of different specific gravities.

Fig. 2 is a horizontal section on the line 2—2 of Fig. 1.

Fig. 3 is a plan view of a portion of the carbureter with a part in section.

Fig. 4 is a longitudinal sectional view of the heater.

Fig. 5 is a plan view of a four-cylinder engine provided with the present fuel supply system.

Fig. 6 is an elevation of the same.

Fig. 7 is a diagrammatic representation showing the electrical connections.

Fig. 8 is a diagrammatic view of a modified arrangement of a thermo-electric switch.

Similar characters of reference denote corresponding parts in the several views.

In a general way it may be stated that the present system contemplates the employment of a carbureter, marked A, having separate compartments for lighter and heavier fuel, as gasolene and kerosene for example; a heater B to which the atomized fuel is led and within which it is subject to the heat best adapted to its particular character, the heater being connected to an appropriate part of the engine C, the exhaust manifold of the latter for example, a thermo-electric switch D, and electrical connections and instrumentalities between the latter and a valve of the heater B, all organized and correlated so as to enable the engine to run on the heavier fuel under predetermined conditions and automatically to shift from the heavier fuel to the lighter fuel under other predetermined conditions, and from the latter fuel to the heavier fuel when conditions through the port $25^a$, and forms a mixing chamber.

The carbureter of the herein exemplified form of the invention, comprises, as shown best in Fig. 1, a cylinder 20, which is divided by internal walls 21 and 22, into two concentric chambers 23 and 24, and a central tube 25, respectively. The tube 25 has communication at one end with the atmosphere, the port $25^a$, and forms a mixing chamber.

The chambers 23 and 24 are respectively intended to contain the different fuels employed, the larger chamber 23 containing gasolene and the smaller chamber 24 containing kerosene, for example. These chambers are respectively connected with sources of supply, not shown, the fuel entering the chambers through passages 26 and 27, and ports 28 and 29, which are closed by valves 30 and 31, which are automatically opened to admit the fuels to the chambers independently of each other by means of floats 32 and 33 in said chambers, said floats having rods 34 and 35, or other suitable projections, which engage the valves 30 and 31, respectively, and press the latter away from their seats against the tension of the springs 36 and 37, which return the valves to their seats. It will be understood that the floats will operate under control of the fuel in their respective chambers to replenish the supply of said fuel when it drops below a predetermined level in the chambers, and will thereby tend to maintain the fuel at a constant level.

The base of the cylinder 20 is provided with passages 38 and 39, the inner ends of which open into a spray nozzle 40 common thereto. This spray nozzle extends into the mixing chamber 25. The passages 38 and 39, respectively, have communication by means of ports 41 and 42, with the fuel chambers 23 and 24. The ports are respectively closed by valves 43 and 44 which are operated automatically by the means hereinafter set forth. The passages 38 and 39 are provided with needle valves, 45 and 46, which are adjusted, as shown, so as to regulate the amount of fuel which is admitted to the spray nozzle 40. A mixture regulating valve 47, having a conical opening, surrounds the spray nozzle 40, in such relation to the outlet openings 49, thereof, that when it is moved relatively to said openings, the area opposite the latter will be increased or diminished, according to the direction of such movement and proportionately to the extent thereof. When the engine is operating the regulating valve is under suction therefrom, and this suction serves to move it in one direction, while a spring 48 serves to move it in the other direction, thereby varying the area opposite the openings 49 of the spray nozzle and causing an increase or decrease in the suction on the openings 49, so as to draw in more or less fuel and proportion the quantity of fuel supplied to the engine under all loads, governed by the variable speed of the engine.

In the present exemplified form of the invention it is to be assumed that as the speed of the engine increases the amount of fuel required will be proportionate thereto under all speeds or loads and the fuel must contain a proportionate amount of fuel and air—also as the speed of the engine is increased the velocity of air through the fuel supply pipes and mixing chamber 25 is increased proportionately, but as is well known an increase in the velocity will produce a pressure from without or a vacuum or suction from within in proportion to the square of the velocity, therefore in this regulating valve with a conical opening, the conical opening is so designed in regard to its taper that the fuel will always contain the correct proportion of fuel and air to give the best results under all speeds or loads. In practice, the valve is employed with either the base outward, as shown in the drawing, or with the end having the small opening outward, according to the conditions required by the auxiliary air inlet valve E, see Figs. 5 and 6, which is sometimes controlled by compound springs and sometimes by simple springs.

The valves 43 and 44 which respectively control the outlet ports 41 and 42, from the fuel chambers 23 and 24, are provided with stems 51 and 52, respectively, which reciprocate through suitable guides 53 and 54, respectively. These valves are held to their seats by springs 55 and 56, and are raised from their seats automatically by means which will now be described.

57 designates an arm pivoted at 58 between the outer ends of the stems, 51 and 52, and provided with oppositely extending fingers, 59 and 60. The finger 59 engages the head 61, on the upper end of the stem 51, and is engaged by a suitable spring 62. The other finger 60, of the arm 57, engages a head 63, on the valve rod 52, and is engaged by a latch 64, which is operated by a spring 64$^a$ and a magnet 65, in a manner which will hereinafter be set forth.

The outer end of the arm 57, is connected by means of a rod 66, with a lever 67, which is secured to the shaft 68, of a valve 69, in the heater B. This heater, as shown most clearly in Fig. 4, comprises a casing 70, within which is a coiled pipe 71, one end 72, of which is connected to the nipple 73 of the mixing chamber 25, of the carbureter A, while its other end 74, is connected to a chamber 81, to which is connected the thermo-electric switch D, as will be hereinafter more particularly set forth. The coiled portion 71, of the pipe within the casing 70, extends helically around a pipe or tube 75, which pipe is provided with the valve 69.

The heater B is preferably connected by a pipe 76, with the exhaust manifold 77. The pipe 76 has its outlet end projecting into the heater B and in line with but spaced from the inlet or inner end of the pipe 75. When the valve 69 is opened the pipe 75 serves as a direct conduit for the fluid passing out of the pipe 76 which heats the fuel flowing through the pipe 71, said heating fluid being preferably the exhaust gas of the engine. When the valve 69 is closed the heating fluid from the pipe 76 is prevented from passing directly into the pipe 75, and is caused to pass around the coils of the fuel pipe 71 and through openings 80, provided in the wall of the pipe 75, just inside of the heater and then through the outlet end of the pipe 75. Baffle plates 78, having openings 79, are preferably interposed between the coils of the pipe 71, to retard the flow of the heating fluid in its passage around said pipe.

When the parts are in the position shown in Fig. 4, most of the exhaust gas will pass directly through pipe 75, but a sufficient amount will pass over and around the coil 71, to maintain a proper temperature when operating under load. When the load is decreased the temperature of the exhaust gas to the heater decreases, and the temperature of the fuel being slightly decreased, sets in operation certain mechanism hereinafter described, whereby the valve 69 is closed, causing all the exhaust gas from the engine to pass over and around the coil 71, thereby raising the temperature of the fuel in said coil. If the temperature of the gas passing over and around the coil 71, still continues to decrease, said mechanism will cause the supply of fuel to be shifted from kerosene to gasolene. The mechanisms which cause this automatic operation of the valve 69, and of the means which control the supply of gasolene and kerosene, are operating under control of the temperature of the fuel in the passage of the latter from the heater or gas producer to the engine, and will now be described.

The heated fuel passes from the coil 71, through the pipe 74 and a chamber 81, within which extends the generating coil 82, which is connected to the switch D, by a pipe 82ª, having a condensing coil 82ᵇ therein. The pipe 82ª, is connected to a pressure tube 83, which is connected to a pinion 84, by intermediate mechanism, such as the pivoted rack 84ª and link 84ᵇ, so that the pinion will rotate in one direction or another as the pressure tube expands or contracts. Secured to the axis of the pinion at 85 is a switch lever having two arms 85ª, 85ᵇ, which contact with insulated terminals 86, 87 and 88, when the arms are caused to move by the expansion or contraction of the pressure tube 83, under predetermined conditions presently to be set forth. The terminals 86, 87 and 88, are in a circuit which includes the electro-magnet 65, and an electric motor F. The electric motor is connected with the shaft 68 of the valve 69, and serves to operate said valve so as to close the passage through the pipe 75, of the heater B, and thereby cause the heating fluid to take the circuitous course around the coil 71, and to be retarded in its passage through the heater, or to open said valve and thereby permit the heating fluid to pass directly through the pipe 75. In the exemplified form of the invention, the motor shaft 89, has a worm 90, which is intermeshed with a gear 90ª, and turns the latter when the motor is energized. This gear 90ª, is mounted upon a shaft 91, and is provided with an insulated metallic segment 92, which makes contact with brushes 93, 94 and 95. This segment has a cut-out portion 96, at the periphery, leaving about 180° of an arc at the periphery, with which the brushes 93 and 94 contact. The brush 95 is always in contact with the segment, while the brushes 93 and 94 are in contact with only about 180°, thereof.

G designates a suitable source of supply of electrical energy, from one pole of which a wire 100 leads to the hub 85 of the switch lever. From the other pole of the source of supply of electrical energy a wire 101 leads and is joined by a wire 102, which is connected to one side of the motor F. A conducting wire 103, leads from the other side of the motor to the brush 95. From the terminal 87, on the switch D, a wire 104 leads to the brush 93, and from the terminal 86, on the switch D, a wire 105 leads to the brush 94. From the terminal 88 of said switch, a wire 106 leads to the magnet 65, and from the magnet 65, a wire 107 extends and is joined to the wire 101. From this description of the electrical connections, it will be apparent that the current may flow through courses of travel as follows:

Assuming that contact is made between the switch arm or hand 85ª and the terminal 86, as shown in full lines in Fig. 7, the current flowing from the battery by way of wire 100, will pass through the switch arm 85ª, wire 105, brush 94, segment 92, brush 95, wire 103, and through the motor F, and back by way of wires 102 and 101, to the source of electrical supply G. This causes the shaft 89, worm 90 and gear 90ª, to turn in the direction indicated by the arrows in Fig. 7, and the shaft 91 to make one-half of one complete revolution, because the segment 92, being slightly less than 180°, passes from contact with brush 94, breaking this circuit and stopping the motor and making contact between the segment 92 and brush 93. The shaft 91 is connected to the shaft 68 by a rod 108, which is connected to the levers 109 and 110 on the shafts 68 and 91, respectively. The end of the rod 108, to which the lever 109 is connected is provided with a slot 108ª, in which the pin 109ª on the end of the lever operates. This connection is such that there is a certain amount of lost motion produced between the connecting rod 108 and the lever 109, whereby the one-half rotation of the shaft 91 causes the shaft 68 to make one-quarter of a revolution and opens the valve to the position shown in full lines in Fig. 4, and dotted lines, in Fig. 6. The movement of the shaft 68 also causes movement to be imparted to the arm 67, and consequently to the rod 66, thereby moving the arm 57 to the position shown in Fig. 1, when the valve 43 is permitted to be seated by the spring 55, and the port 41 closed, thereby shutting off the supply of gasolene to the heater. At the same time the valve 44 is unseated against the action of the spring 56, and held in its open position by the latch 64, which is thrown under the finger 60 of the shifting arm or lever 57, by the spring 64ª, and holds the valve 44 unseated, and kerosene is permitted to flow from the chamber 22, into the conduit 38, from which conduit the fuel passes through the spray nozzle 40, and into the mixing chamber 25, and thence through the pipe 72, and into the coils 71, within the heater B. Passing from said coil 71 by way of pipe 74, and into the chamber 81, the heated fuel leaves the chamber 81, and flows by way of the pipe 111, to the auxiliary air supply valve or mixer E, and thence into the fuel supply manifold 112. Under these conditions it may be assumed that the engine is operating properly with kerosene, which, in its passage through the heater is subjected to the heat of the heating fluid flowing directly or in a more retarded course from the pipe 76, through the pipe 75.

It will be understood that the switch arm 85$^a$, has motion imparted to it from pressure generated in the generating coil 82, from the hot vapor which flows around said coil within the chamber 81, this hot vapor being the heated fuel. This pressure tends to straighten the tube 83, which is connected to the switch lever as hereinabove described, and swings the arms of the lever in one direction. When the temperature of the vapors decrease, the pressure in the tube 83 decreases and causes the lever arms to spring in the opposite direction.

Assuming, as already stated, that the engine is working properly with the arm 85$^a$, making contact with the terminal 86, in which case the valve 69 is open, this condition will continue and the engine will be run on kerosene until from some cause or other, such as change of load, the temperature of the fuel in its passage through the coil 71, is reduced to a point below a predetermined degree. This may be caused by a decrease of the load, in which event less exhaust will pass through the heater and the temperature of the chamber 81 will fall, causing the pressure in the generating coil 82 to decrease, the tube 83 to contract, and through connections with the switch lever, the arm 85$^a$ to move from the terminal 86 into contact with the terminal 87, as shown in dotted lines, 1, in Fig. 7, when the current will take the following course: from source G, by way of wire 100, hub 85, arm 85$^a$, terminal 87, wire 104, brush 93, segment 92, brush 95, wire 103, motor F, wire 102, and back to source. This will cause the motor to operate to turn the shaft 91, through worm and gear 90 and 90$^a$, one-half of one revolution, and its shaft 68, to turn one-fourth of one revolution, and will thereby close the valve 69, and cause all the exhaust gas from the engine to pass over and around the coil 71, and through the openings 80, into the outlet end of the pipe 75, then to atmosphere. During this operation the connecting rod 66 is moved so that its connecting pin 66$^a$ is moved to the right of the slot 57$^a$ in the shifting lever 57, as shown in dotted lines in Fig. 1, without moving said switch lever. If the temperature of the exhaust passing around the coil 71 continues to decrease, the temperature of the fuel passing through the chamber 81 will also decrease, the tube 83 will contract further until the switch lever is moved around with its arm 85$^a$ out of contact with the terminal 87, and the arm 85$^b$ in contact with the terminal 88, as shown by dotted lines in Fig. 7, and the following circuit is thereby completed: from the source of supply G, by wire 100, to hub 85, to the arm 85$^b$, to terminal 88, by wire 106, to the electro-magnet 65, and thence back to the source of supply by way of the wires 107 and 101. The energizing of the magnet 65 causes it to attract the latch or stop 64, against the tension of the spring 64$^a$, and thereby withdraws the latter from engagement with the arm 60, of the shifting lever 57. The spring 62 now becomes operative upon the arm 59, of said shifter to turn the latter pivotally, thereby raising the valve 43, which controls the supply of gasolene to the passage 38. The arm 60, of the shifting lever descending, permits descending movement to be imparted to the valve 44, by the spring 56, said valve 44 being thereby seated and cutting off the supply of kerosene and turning on gasolene.

The motor control apparatus preferably includes a brake wheel 89$^a$, having an adjustable spring operating pin 89$^b$, to produce a certain amount of friction on the wheel 89$^a$, to overcome the momentum of the shaft 89.

From the foregoing description it will be understood that the engine is started on gasolene in the usual manner, at which time the arm 85$^b$ is in contact with the terminal 88, the latch 64 is out of engagement with the finger 60, and the arm or lever 57 is rocked under the influence of the spring 62, to open the valve 43 and close the valve 44, and the valve 69 is closed. When the engine is run a sufficient length of time, the temperature of the fuel being supplied to the engine will be raised so that the arm 85$^b$ will be moved out of contact with the terminal 88, and 85$^a$ will be moved into contact with the terminal 86, when the valve 69 will be opened and the arm 57$^a$ moved to the position shown in Fig. 7, to permit the valve 43 to close and 44 to open, the latter valve being held open by the finger 64. Under these conditions kerosene will be supplied to the engine. While running under kerosene, should the temperature of the fuel decrease a trifle, the arm 85$^a$ will move to contact the terminal 87 and close the valve 69, but this movement will not cause the arm 57 to cause movement of the valves 43 and 44, because under these conditions the pin 66$^a$ of the rod 66 will move in the slot 57$^a$ without causing any movement of the lever or arm 57. However, should the temperature still continue to fall, the arm 85$^b$ will contact with the terminal 88, energizing the magnet 65, pulling the latch 64 out of engagement with the finger 60, whereupon the spring 62 will rock the arm 57 on its pivot to open the valve 43 and permit the valve 44 to be closed by the spring 56, thereby supplying gasolene to the engine and turning off the kerosene. When the temperature of the fluid flowing toward the engine is raised sufficiently, the gasolene will be shut off and the kerosene supplied in the manner hereinabove described. Thus the engine is being automatically run on gasolene or kerosene, according to the predetermined conditions.

It is to be understood that the motor always operates in one direction so that the segment 92 will also move in one direction, as indicated by the arrow on the same in Fig. 7, and of course, the connection is such that the levers 110, 109 and 67, are also moved in the same direction, as indicated by the arrows in Fig. 6. It is also to be understood that as the motor drives the shaft 91, the periphery of the segment 92 moves from under the brushes 93 and 94 so that the electric circuit is broken when the cut-away portion of said part of the segment is opposite either one or the other of said brushes.

In Fig. 8 I have shown a modified construction of a thermo-electric switch which consists of a bent tube D', having one end $d$, projecting into the chamber $81^a$. In this tube is a body of mercury having two columns $85^1$ and $85^2$. The said tube is provided with a terminal $85^x$, which is always in contact with the mercury in said tube, and to which is connected the conducting wire 100. The tube is also provided with terminals $86^a$, $87^a$ and $88^a$, which project in the path of the mercury columns and to which are connected, respectively, the conducting wires 105, 104 and 106. The variation in temperature of the fluid in the chamber 81 causes the mercury columns to change their positions and make and break the connections in an obvious manner and causes the motor F and the magnet 65 to be operated in the same manner as hereinabove described.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense.

Having now described my invention, what I claim as new and desire to secure by Letters Patent, is:—

1. In a fuel supply system for internal combustion engines, separate chambers for fuels of different specific qualities, valves for controlling the flow of said fuels from their chambers, and mechanism for alternately opening and closing the valves to shift from one fuel to the other under predetermined conditions, said mechanism including a fulcrumed arm having fingers respectively connected with the valves, means for preventing movement of the shifting arm, and means for withdrawing the latter means from its operative relation with the shifting lever when change from one fuel to the other is desired.

2. In a fuel supply system for internal combustion engines, separate chambers for fuels of different specific qualities, valves for controlling the flow of the fuels from their chambers, mechanism for alternately opening and closing the valves to shift from one fuel to the other, means for heating the fuel in its passage to the engine, means operable to prevent the operation of the valve-operating mechanism, so as to hold the valves in predetermined positions, and means whereby the means for preventing operation of the valve-operating mechanism is adjusted out of operative relation with the latter under control of the temperature of the fuel after the latter has been heated.

3. In a fuel supply system for internal combustion engines, separate chambers for fuels of different specific qualities, valves for controlling the flow of said fuels from their chambers, mechanism for alternately opening and closing the valves to shift from one fuel to the other, means for heating the fuel in its passage to the engine, the valve-shifting mechanism including a fulcrumed lever having arms respectively connected with the valves, a stop adapted to be interposed in the path of operation of the lever, a magnet adapted when energized to withdraw the stop from its operative relation with the lever-shifting mechanism, and means whereby the magnet is energized when the temperature of the heated fuel reaches a predetermined point.

4. In a fuel supply system for internal combustion engines, separate chambers for fuels of different specific qualities, valves for controlling the flow of said fuels from their chambers, mechanism for alternately opening and closing the valves to shift from one fuel to the other, means for heating the fuel in its passage to the engine, the valve-shifting mechanism including a fulcrumed lever having arms respectively connected with the valves, a stop adapted to be interposed in the path of operation of the lever, a magnet adapted when energized to withdraw the stop from its operative relation with the lever-shifting mechanism, a circuit maker and breaker for closing and opening the circuit to said magnet, said circuit maker and breaker comprising an actuating means which is subject to and operable under control of the temperature of the heated fuel.

5. In a fuel supply system for internal combustion engines, a carbureter comprising separate chambers for fuels of different specific qualities, a mixing chamber, a spraying nozzle in said mixing chamber and adapted to be alternately connected with each of said fuel chambers, and valve mechanism for controlling the supply of fuel to said spraying nozzle; a conduit through which fluid may flow to the engine; a thermo responsive device associated with said conduit and past which the fluid flowing to the engine flows; and means dependent for operation upon said thermo responsive device for controlling said valve mechanism to thereby determine which of said fuels shall be used at a given time.

6. In a fuel supply system for internal combustion engines, a carbureter comprising separate chambers for fuels of different specific qualities, a mixing chamber, a spraying nozzle in said mixing chamber and adapted to be connected alternately with each of said fuel chambers, and valve mechanism for controlling the supply of fuel to said spraying nozzle; a conduit through which fluid may flow to the engine; heating means included in said conduit whereby the fluid is heated in its passage to the engine; a thermo responsive device past which the heated fluid flows; and means dependent for operation upon said thermo responsive device for controlling said valve mechanism to thereby determine which fuel shall be used at a given time.

7. In a fuel supply system for internal combustion engines, two separate chambers arranged one within the other and adapted to contain fuels of different specific qualities, a mixing chamber located within the inner of said chambers, a spraying nozzle located within said mixing chamber and with which nozzle both of said fuel chambers communicate, valve mechanism for controlling the flow of fuel from said fuel chambers to said nozzle, and means for controlling the supply of fuel to said fuel chambers.

8. In a fuel supply system for internal combustion engines two separate chambers arranged concentric with reference to one another and adapted to contain fuels of different specific qualities, fuel supply conduits leading one into each of said chambers, a valve associated with each of said conduits and adapted to control the flow of fuel therethrough, two floats located one in each of said chambers and which floats are adapted to operate said valves, a mixing chamber located within the inner of said chambers, a spraying nozzle located within said mixing chamber and with which nozzle both of said fuel chambers communicate, and valve mechanism for controlling the flow of fuel from said fuel chambers to said nozzle.

9. In a fuel supply system for internal combustion engines, separate chambers for fuels of different specific qualities, valves for controlling the flow of said fuels from their chambers, a heater through which the fuels pass after leaving their chambers, said heater having means providing a plurality of courses of travel of a heating fluid therethrough, a valve for controlling said means, a make-and-break mechanism, a chamber containing a generating coil, said chamber having an inlet for the heated fuel from the heater and an outlet for said fuel to the engine, means operated by the pressure generated in the coil for operating the make-and-break mechanism, and electrical means between the make-and-break mechanism and the valve of the heater for operating the latter under control of the heated fuel.

10. In a fuel supply system for internal combustion engines, separate chambers for fuels of different specific qualities, valves for controlling the flow of said fuels from their chambers, a heater through which the fuels pass after leaving their chambers, said heater having means providing a plurality of courses of travel of a heating fluid therethrough, a valve for controlling said means, a make-and-break mechanism comprising contacts and a pivoted arm, a chamber containing a generating coil, said chamber having an inlet for the heated fuel from the heater and an outlet for said fuel to the engine, means operated by the pressure generated in the coil for operating the pivoted arm of the make-and-break mechanism, and electrical means interposed between the contacts and the valve of the heater for operating the latter under control of the heated fuel.

11. In a fuel supply system for internal combustion engines, valve-controlled chambers for fuels of different specific qualities, a heater through which the fuels flow in their passage from said chambers, said heater having means providing a plurality of courses of travel for a heating fluid therethrough, means through which it has communication with the exhaust of the engine for the supply of said heating fluid and a valve for controlling the course of travel of the heating fluid, and means for automatically operating said valves under control of the heated fuel, comprising an electric motor, contacts, a pivoted arm adapted to said contacts, a chamber having an inlet for the heated fuel from the heater and an outlet for said fuel to the engine, a generating coil in said chamber, a condensing coil connected to the generating coil, means whereby the pivoted arm is operated by the pressure generated in the generating coil, electrical connections between the contacts and motor, and means whereby the motor operates the valves of the heater and fuel chambers.

12. In a fuel supply system for internal combustion engines, valve-controlled chambers for fuels of different specific qualities, a heater through which the fuels flow in their passage from said chambers, said heater having means providing a plurality of courses of travel of a heating fluid therethrough, means through which it has communication with the exhaust of the engine for the supply of said heating fluid and a valve for controlling the course of travel of the heating fluid, and means for automatically operating the valves of the fuel chambers and heater under control of the heated fuel, comprising a connection between said valves, an electric motor, a shaft, a gear which turns with the shaft and has connection with the motor and with one of said valves, a source of supply of electrical energy and suitable circuit connections between the motor and the latter, said connections including a pivotally movable member and appropriate contacts, and means whereby said member is operated to close the circuits under control of the heat of the fuel.

13. A device of the character described comprising an outer wall and an inner wall, such inner wall forming a central chamber, a wall disposed between said outer wall and said inner wall forming two independent chambers, a float in each chamber, independent supply means communicating from each of said independent chambers with said central chamber, an outlet from said central chamber and an air inlet into said central chamber, as described.

14. A device of the character described comprising the combination of a casing, two independent chambers within said casing, means for admitting an independent fluid to each of said chambers, a carbureting chamber, means for admitting said fluid from said independent chambers to said carbureting chamber, such means including a means for opening communication from one of said independent chambers to said mixing chamber and closing communication from the other of said independent chambers to said mixing chamber simultaneously therewith, as described.

In witness whereof I have hereunto set my hand at New York, county of New York and State of New York, this 16th day of January, 1912.

WILLIAM K. BASSFORD.

In presence of:
ISABEL R. RICHARDS,
JOHN J. RANAGAN.